United States Patent
Matsushiro et al.

(10) Patent No.: US 6,201,612 B1
(45) Date of Patent: Mar. 13, 2001

(54) IMAGE PROCESSING METHOD AND APPARATUS EMPLOYING BLOCK ERROR DIFFUSION

(75) Inventors: Nobuhito Matsushiro; Kazuyo Kurabayashi, both of Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 09/044,368

(22) Filed: Mar. 19, 1998

(30) Foreign Application Priority Data

Mar. 26, 1997 (JP) .................................................. 9-091442

(51) Int. Cl.[7] .......................... H04N 1/403; H04N 1/405; H04N 1/40; G06K 9/34; G06K 9/38
(52) U.S. Cl. ........................... 358/1.9; 358/462; 358/465; 358/466; 382/252; 382/176
(58) Field of Search ..................................... 358/465, 462, 358/466, 456; 382/252, 199, 176, 270, 237

(56) References Cited

U.S. PATENT DOCUMENTS

| 4,709,274 | * | 11/1987 | Tanioka et al. | 382/252 |
| 5,018,024 | * | 5/1991 | Tanioka et al. | 382/199 |
| 5,034,990 | * | 7/1991 | Klees et al. | 358/462 |
| 5,077,615 | * | 12/1991 | Tsuji et al. | 382/176 |
| 5,130,823 | * | 7/1992 | Bowers et al. | 382/252 |
| 5,748,794 | * | 5/1998 | Maeda et al. | 382/252 |
| 5,757,976 | * | 5/1998 | Shu et al. | 358/465 |

OTHER PUBLICATIONS

Miyata et al., "A Study of Improvement of Image Quality in Hardcopy using Multi Level Error Diffusion Method," 25th Image Engineering Conference, 1994, pp. 101–104.

* cited by examiner

Primary Examiner—Scott Rogers
(74) Attorney, Agent, or Firm—Akin, Gump, Strauss, Hauer & Feld, L.L.P.

(57) ABSTRACT

A multi-level input image is divided into blocks, each of which is quantized to a bi-level output block. A single quantization error value is calculated for each block, and distributed over neighboring blocks that have not yet been processed. Blocks containing abrupt changes in image content are preferably converted by comparing each picture element individually with a threshold value. Blocks not containing abrupt changes are preferably quantized by comparing the average value of the block with multiple threshold values to determine a multi-level block output value, from which a predetermined pattern of bi-level picture elements is generated.

10 Claims, 9 Drawing Sheets

$$S(x,y) = D(x,y) + \frac{1}{2}BE(x-1,y) + \frac{1}{8}BE(x-1,y-1)$$
$$+ \frac{1}{4}BE(x,y-1) + \frac{1}{8}BE(x+1,y-1)$$

| 1 | 2 |
|---|---|
| 4 | 3 |

FIG. 8

| 7 | 8 | 9 | 10 |
|---|---|---|----|
| 6 | 1 | 2 | 11 |
| 5 | 4 | 3 | 12 |
| 16 | 15 | 14 | 13 |

IMAGE PROCESSING METHOD AND APPARATUS EMPLOYING BLOCK ERROR DIFFUSION

BACKGROUND OF THE INVENTION

The present invention relates to a method and apparatus for converting a multi-level digitized image to a bi-level image.

Multi-level digitized images are generated by, for example, digital cameras, scanners, and computer software. In a multi-level monochrome image, each picture element or pixel can take on various levels of gray, the number of levels being greater than two. A multi-level color image comprises a plurality of color planes, each pixel having more than two possible levels in each color plane.

Multi-level images are often printed or displayed by bi-level output devices capable of expressing only two levels, normally a black level and a white level in a monochrome output device, or an on-level and an off-level for each color plane in a color output device. Before being output by such a device, a multi-level image must be converted to bi-level form.

Among the known techniques for converting multi-level images to bi-level images are halftone patterns, dithering, error diffusion, and mean error minimization. These terms are sometimes used with overlapping meanings; for example, mean error minimization is often referred to as error diffusion.

A halftone pattern is an m×m pattern of bi-level output pixels, generated from a single input pixel by using different threshold values for different pixels in the output pattern (m is an integer greater than one). Halftone patterns are often used on input images with relatively low information content, such as television images.

Dithering tiles an input image with an n×n matrix of differing threshold values, where n is an integer greater than one, and converts each input pixel to a single bi-level output pixel by comparing the input pixel value with the corresponding threshold value. Dithering is used in high-resolution image processing equipment, including copiers.

A problem with halftone patterns and dithering is the limited number of gray levels that can be expressed ($m^2+1$, or $n^2+1$). With small values of m and n, the limited gray scale produces unwanted contour lines in what should be smooth areas. If the value of m or n is increased to provide more gray levels, spatial resolution is lost, and the converted image begins to have a visibly blocky appearance. For this reason, dithering is rarely practiced with values of n larger than four.

The error diffusion and mean error minimization methods smooth out the errors caused by bi-level quantization. In error diffusion, the quantization error of a pixel is distributed over a certain number of subsequently-processed pixels. In the mean error minimization method, the value of a pixel is modified according to a weighted average of the quantization errors in a certain number of preceding pixels. Both methods give the same result, and can achieve comparatively smooth gray-scale expression with comparatively little loss of spatial resolution.

The error diffusion method and mean error minimization methods, however, require much computation to distribute the quantization error of each pixel individually. Processing is particularly slowed by the frequent need to access a memory area in which the quantization error values are stored.

Error diffusion or mean error minimization can also be used when a multi-level image is converted to a multi-level image with a smaller number of levels, a process sometimes referred to as color reduction. Compared with bi-level error diffusion, multi-level error diffusion yields a considerable improvement in image quality, even if the number of output levels is only three, but requires a multi-level output device, which is more expensive than a bi-level output device.

SUMMARY OF THE INVENTION

An object of the present invention is to provide an image processing apparatus, method, and computer program for converting a multi-level image to a bi-level image, combining high processing speed with smooth expression of gray levels.

Another object of the invention is to avoid blurring of edges in the converted bi-level image.

The invented method comprises the steps of:

dividing an input multi-level image into blocks;

modifying the pixel values in each block according to block quantization errors in neighboring blocks quantized previously;

quantizing each modified block, thereby generating a bi-level output block; and calculating and storing a single block quantization error for each block.

The quantizing step can be carried out by a bi-level quantization process, by comparing the modified value of each pixel in a modified block with a corresponding threshold value. Alternatively, the quantizing step can be carried out by a multi-level quantization process, by comparing the average modified value of the pixels in the block with a plurality of threshold values, and outputting a fixed pattern of bi-level pixels corresponding to the quantized level of the block as a whole.

Preferably, both of these processes are employed, and a step of detecting edges in the blocks is added. Bi-level quantization is used in blocks with edges. Multi-level quantization is used in blocks without edges.

The invented image processing apparatus comprises an image partitioner for dividing the input image into blocks, and a block error diffusion processor for modifying pixel values, generating bi-level output blocks, and calculating and storing block quantization errors. The apparatus preferably also comprises a selector for detecting edges and choosing between the bi-level quantization process and the multi-level quantization process.

The invented computer program comprises computer code means, stored in a computer-readable medium, for carrying out the steps described above.

DETAILED DESCRIPTION OF THE INVENTION

An image-processing apparatus embodying the present invention will be described with reference to the attached exemplary drawings, following a brief description of conventional error diffusion and multi-level error diffusion.

Figure 1:
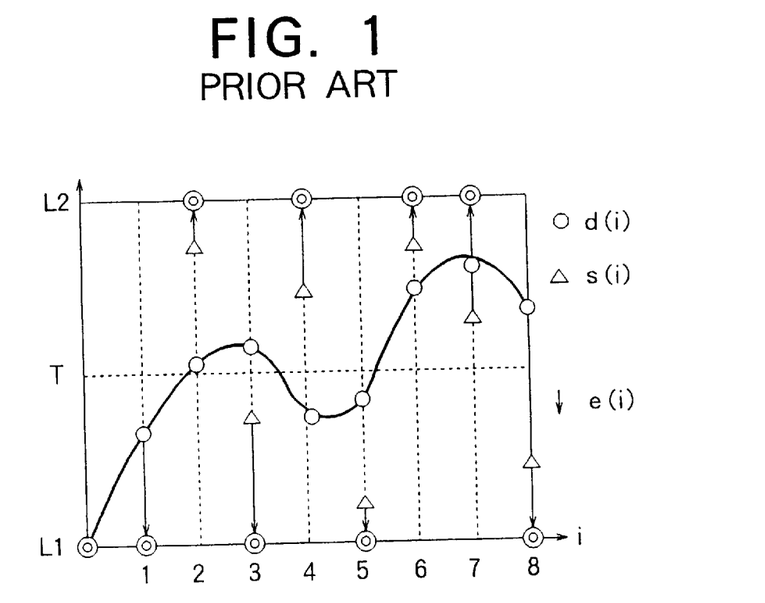
FIG. 1 illustrates a simplified type of bi-level error diffusion.

To illustrate the error diffusion concept, FIG. 1 shows a simplified case in which a one-dimensional multi-level monochrome image is converted to a bi-level image. The horizontal axis indicates the position of eight pixels (i=1 to 8) in the one-dimensional image. The vertical axis indicates the level of each pixel. L1 and L2 are the two output levels. T is a threshold located halfway between L1 and L2. Single circles represent the input pixel values d(i).

The first pixel value d(1) is less than the threshold T, so the first pixel is quantized to the lower output level L1, as indicated by the double circle, leaving a quantization error e(1).

$$e(1)=d(1)-L1$$

This quantization error is added to the second pixel value d(2) to obtain a modified pixel value s(2), indicated by a triangle.

$$s(2)=d(2)+e(1)$$

The second pixel is quantized according to its modified value s(2). Since s(2) is greater than the threshold T, the second pixel is quantized to the upper output level L2, leaving a quantization error e(2).

$$e(2)=s(2)-L2$$

This quantization error e(2) is added to the third pixel value d(3) to obtain a modified value s(3).

$$s(3)=d(3)+e(2)$$

The above process continues, with results as shown in the drawing.

Figure 2:
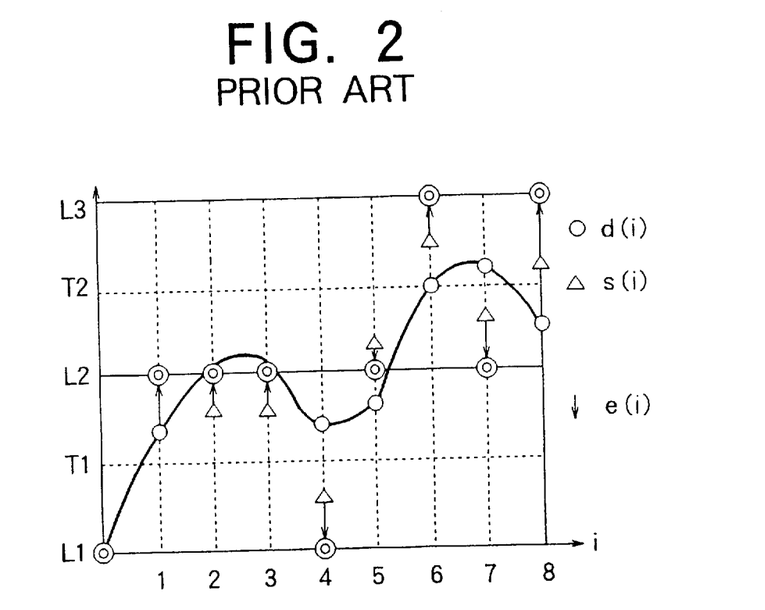
FIG. 2 illustrates a simplified type of multi-level error diffusion.

FIG. 2 illustrates multi-level error diffusion, using the same notation as in FIG. 1. There are now three output levels, L1, L2, and L3, and two thresholds, T1 and T2. Threshold T1 is located halfway between L1 and L2, while threshold T2 is located halfway between L2 and L3.

The first pixel value d(1) is compared with levels L1 and L2 to determine whether the following condition is satisfied.

$$L1 \leq d(1) < L2$$

This condition is satisfied, so the first pixel value d(1) is compared with threshold T1. Since d(1) is greater than T1, the first pixel is quantized to level L2, leaving a quantization error e(1).

$$e(1)=d(1)-L2$$

The second pixel value is modified by adding this quantization error.

$$s(2)=d(2)+e(1)$$

The modified value s(2) is compared with levels L1 and L2 as above.

$$L1 \leq s(2) < L2$$

This condition is not satisfied, but the following condition is satisfied.

$$L2 \leq s(2) \leq L3$$

The modified value s(2) is accordingly compared with threshold T2. Since s(2) is less than T2, the second pixel is also quantized to level L2, leaving a quantization error e(2).

$$e(2)=s(2)-L2$$

This quantization error e(2) is added to the third pixel value d(3) to obtain a modified value s(3).

$$s(3)=d(3)+e(2)$$

The above process continues, giving the results shown.

When these error diffusion processes are practiced on a two-dimensional image, the quantization error of each pixel is not added to just one adjacent pixel, but is distributed over a plurality of neighboring pixels, different portions of the error being assigned according to differing distances between the error donor pixel and error recipient pixel.

Next, the invented image processing method will be briefly described.

Figure 3:
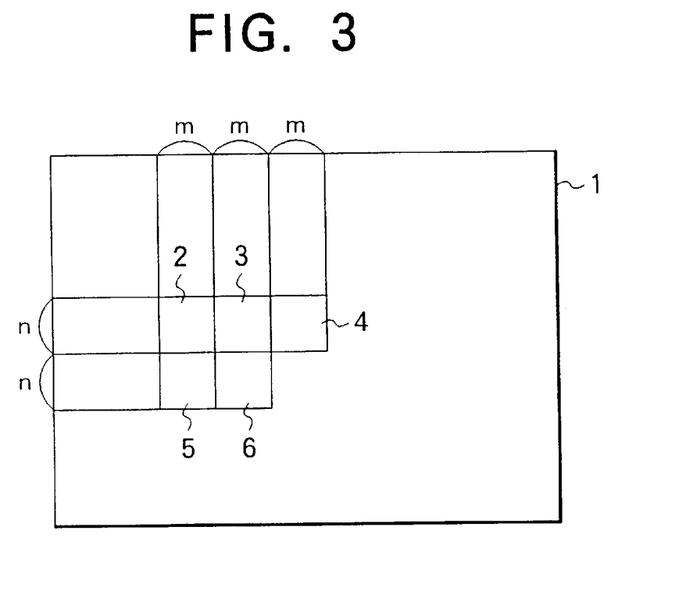
FIG. 3 illustrates the division of an image into blocks.

Referring to FIG. 3, an input image 1 is divided into m-by-n blocks of pixels, where m and n are both integers greater than one. The blocks are quantized one at a time, proceeding, for example, from left to right and from top to bottom in the image. An average quantization error is calculated for each block, and these average block quantization errors are distributed to neighboring blocks. One distribution scheme distributes portions of the average quantization errors from blocks 2, 3, 4, and 5 to block 6.

Figure 4:
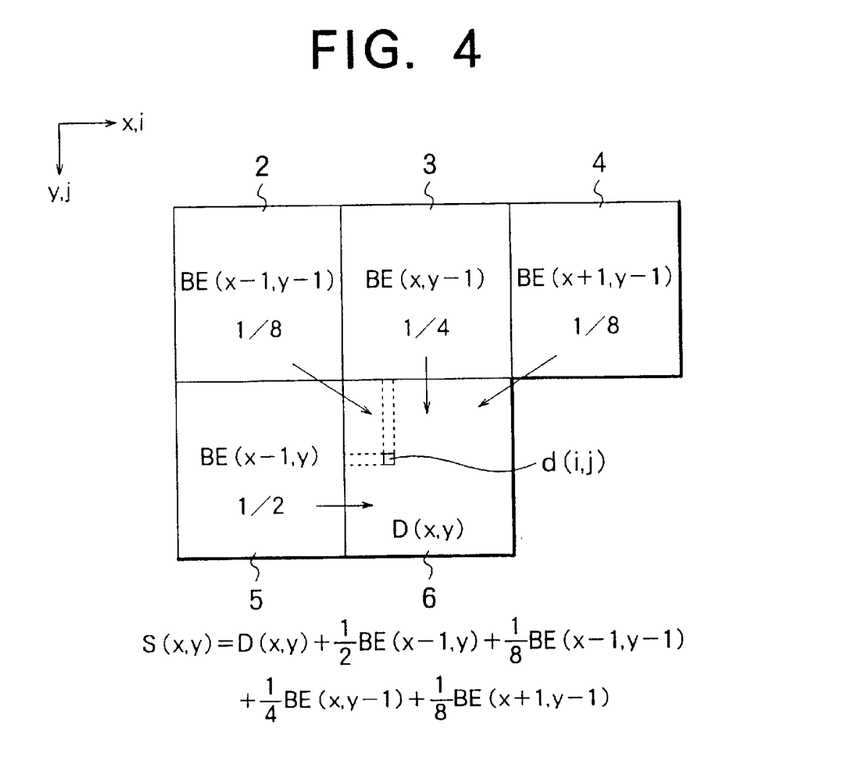
FIG. 4 illustrates block error diffusion.

FIG. 4 illustrates this error distribution scheme in more detail. The blocks are identified by x-coordinates in the row direction and y-coordinates in the column direction. Individual pixels are identified by i-coordinates in the row direction and j-coordinates in the column direction. D(x, y) denotes the average value of the pixels in block 6. BE(x−1, y) denotes the average quantization error in block 5, referred to below as the block error of block 5. Block 6 receives half of the block error of block 5, one-fourth of the block error of block 3, and one-eighth of the block errors of blocks 2 and 4.

When multi-level quantization is employed, these portions of the block errors are added to the average pixel value D(x, y) in block 6 to obtain a modified average value S(x, y), as shown by the equation in FIG. 4. S(x, y) is then quantized on a multi-level scale, and a pattern of bi-level pixel values for the entire block 6 is generated from the single quantized value of S(x, y).

When bi-level quantization is employed, the indicated portions of the block errors of blocks 2, 3, 4, and 5 are added to each individual pixel value d(i, j) in block 6, and the modified pixel values are compared with respective thresholds to generate bi-level pixel values.

Regardless of which type of quantization is employed, the quantization error is distributed on a block basis, so the invented method can be referred to as block error diffusion.

The image-processing apparatus described below employs both types of quantization, selecting between them by detecting edges in each block.

Figure 5:
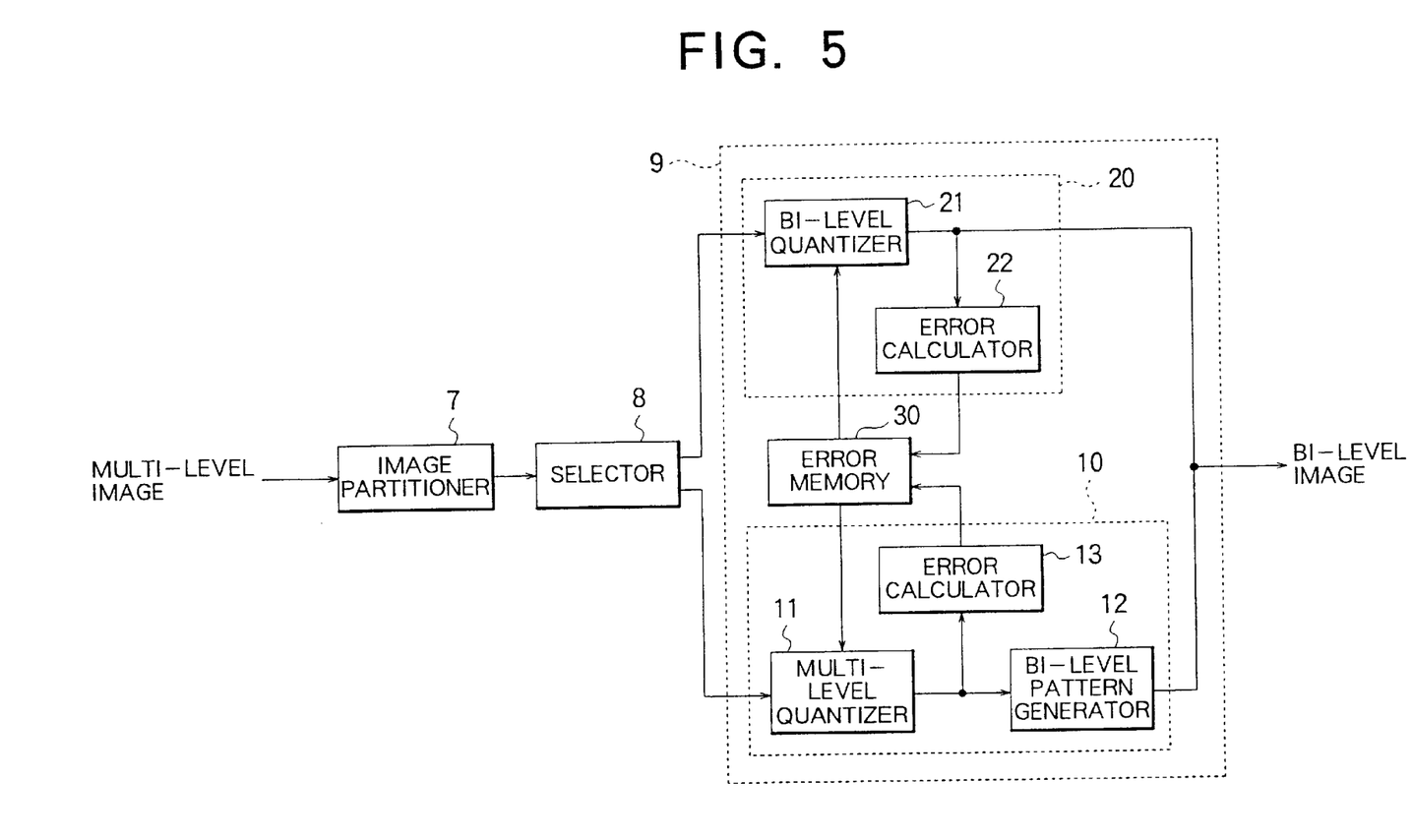
FIG. 5 is a block diagram of an image-processing apparatus embodying the invention.

Referring to FIG. 5, the apparatus comprises an image partitioner 7, a selector 8, and a block error diffusion processor 9.

The image partitioner 7 divides the input image into blocks as shown in FIG. 3, and sends the blocks one at a time to the selector 8. Upon receiving a block, the selector 8 compares the values of the four corner pixels of the block to determine the presence or absence of edges. Specifically, the selector 8 calculates the absolute value of the difference between the values of the pixels at the two corners on each of the four sides of the block, and compares these four absolute differences with an edge threshold value. If any one of the absolute differences is equal to or greater than the edge threshold, the block is deemed to contain an edge. If all four of the absolute differences are less than the edge threshold, the block is deemed not to contain an edge.

Blocks determined in this way to contain edges are blocks in which the pixel value changes by a comparatively large amount (exceeding the edge threshold) in a comparatively short distance (m pixels or n pixels). This corresponds to the usual notion of an edge as a place where the content of an image changes abruptly.

Blocks determined not to have edges are passed to a multi-level error diffusion processor 10 in the block error diffusion processor 9, which carries out the multi-level quantization process outlined above. The multi-level error diffusion processor 10 comprises a multi-level quantizer 11 that quantizes the received block as a whole to a single multi-level value, a bi-level pattern generator 12 that generates a pattern of bi-level output pixel values from the single multi-level value, and an error calculator 13 that calculates the quantization error of the single multi-level value. Bi-level output pixels will also be referred to as black and white pixels below.

Blocks determined to have edges are passed to a bi-level error diffusion processor 20 in the block error diffusion processor 9, which carries out the bi-level quantization process outlined above. The bi-level error diffusion processor 20 comprises a bi-level quantizer 21 that quantizes each pixel in the block to a bi-level output value, and an error calculator 22 that calculates the average quantization error of the block as a whole.

The block error diffusion processor 9 also has an error memory 30, in which the quantization error values calculated by the error calculators 13 and 22 are stored. The multi-level quantizer 11 and bi-level quantizer 21 both read and make use of the stored quantization errors, also referred to below as block errors.

The output of the image-processing apparatus comprises the bi-level pixel values generated by the bi-level pattern generator 12 and bi-level quantizer 21.

Figure 6:
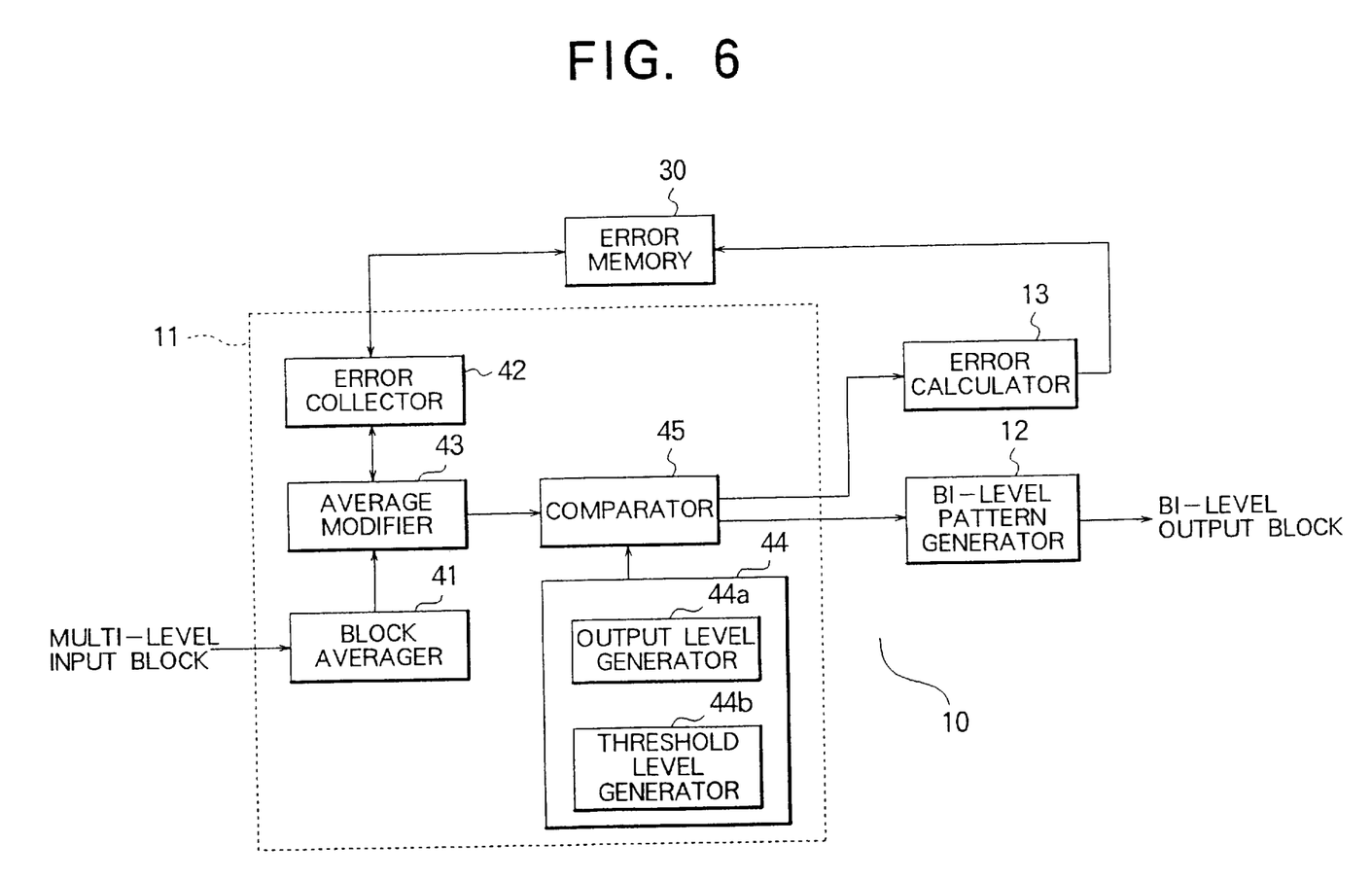
FIG. 6 is a more detailed block diagram of the multi-level error diffusion processor in the apparatus.

Referring to FIG. 6, the multi-level quantizer 11 comprises a block averager 41, an error collector 42, an average modifier 43, a level generator 44, and a comparator 45.

The block averager 41 calculates the average value $D(x, y)$ of the pixel values $d(i, j)$ in the received block, where $x$ and $y$ are the coordinates of the received block, $i$ varies from zero to $m-1$, and $j$ varies from zero to $n-1$.

The error collector 42 reads the block errors of neighboring blocks from the error memory 30, multiplies the block errors by weights of one-half, one-fourth, and one-eighth, and adds the results together to obtain a block error sum, denoted BEsum, as follows.

$$BEsum=(½)BE(x-1, y)+(¼)BE(x, y-1)/4+(⅛)BE(x-1, y-1)+(⅛)BE(x+1, y-1)$$

The average modifier 43 adds the block error sum BEsum to the average value of the pixels in the block to obtain a modified block average value $S(x, y)$.

$$S(x, y)=D(x, y)+BEsum$$

The level generator 44 comprises an output level generator 44a that generates a set of block output levels $L(N)$, and a threshold level generator 44b that generates a set of threshold levels $T(N)$. The maximum number of block output levels is one more than the number of pixels in the block, but it is not necessary to use the maximum number. In the following description, the number of block output levels is equal to the number of pixels in the block (m×n). The number of threshold levels is one less than the number of block output levels.

The lowest block output level $L(0)$, corresponding to white, is equal to the lowest possible value Smin of the modified block average value $S(x, y)$, which occurs when all pixels in the block have the minimum value and the block error sum BEsum has the largest possible negative value. The highest block output value $L(m×n)$, corresponding to black, is equal to the highest possible value Smax of the modified block average value $S(x, y)$, which occurs when all pixels in the block have the maximum value and the block error sum BEsum has the largest possible positive value. The other block output levels are distributed evenly between these two values, according to the following formula, in which N varies from zero to (m×n−1).

$$L(N)=N\times(Smax-Smin)/(m\times n-1)+Smin$$

The threshold levels are disposed halfway between the block output levels. As an example, if m and n are both equal to two, and if the input image has been pre-processed so that the pixel values are confined to the range from forty-two to two hundred thirteen, the following block output levels and threshold levels can be conveniently used.

| L(3) = 255 | T(2) = 212 |
|---|---|
| L(2) = 170 | T(1) = 127 |
| L(1) = 85 | T(0) = 42 |
| L(0) = 0 | |
| 42 ≦ d(i, j) ≦ 213 | |

The output level generator 44a and threshold level generator 44b can generate successive block output levels $L(N)$ and threshold levels $T(N)$ by simple arithmetic operations, e.g., by adding eighty-five in the example above.

The comparator 45 compares the modified block average $S(x, y)$ received from the average modifier 43 with the block output levels to find a value of N such that $S(x, y)$ lies between $L(N)$ and $L(N+1)$. When N is less than (m×n−1), the condition to be satisfied is the following.

$$L(N)\leq S(x, y)<L(N+1)$$

When N is equal to (m×n−1), the condition is modified slightly, as follows.

$$L(N)\leq S(x, y)\leq L(N+1)$$

Having found this value of N, the comparator 45 compares $S(x, y)$ with the corresponding threshold value $T(N)$.

If $$S(x, y) \leq T(N),$$

the comparator 45 outputs the value of N to the bi-level pattern generator 12, and outputs the corresponding block output level L(N) and the modified block average value S(x, y) to the error calculator 13. If $$S(x, y) > T(N),$$

the comparator 45 outputs the next higher value (N+1) to the bi-level pattern generator 12, and outputs the corresponding block output level L(N+1) and the modified block average value S(x, y) to the error calculator 13.

The error calculator 13 subtracts the block output level L(N) or L(N+1) from the modified block average value S(x, y) to obtain the block error BE(x, y), and stores the block error in the error memory 30, for use in the processing of subsequent blocks.

The bi-level pattern generator 12 generates a block of bi-level pixels in which the number of black pixels is equal to the number N (or N+1) received from the comparator 45. The black pixels are arranged in a pattern of low spatial frequency, preferably in a pattern clustered around the center of the block. A simple way to generate such patterns is to number the pixel positions from one to (m×n) and place black pixels in the first N (or N+1) positions.

Figure 7:
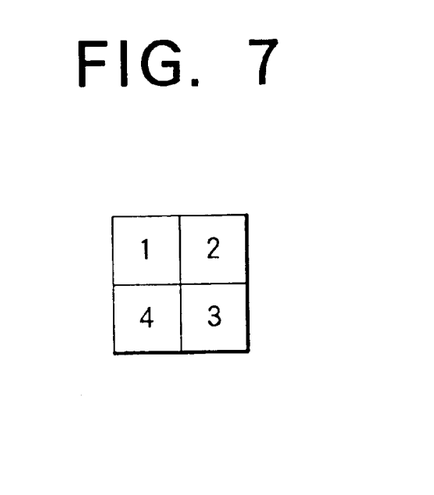
FIG. 7 illustrates a numbering pattern in a two-by-two block.
Figure 8:
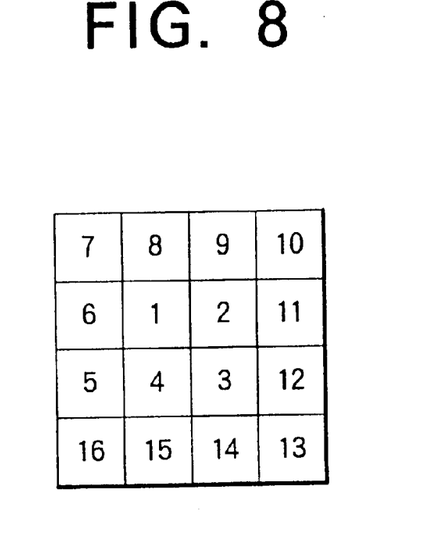
FIG. 8 illustrates a numbering pattern in a four-by-four block.

FIG. 7 shows an example of a numbering pattern that can be used when m and n are both equal to two. FIG. 8 shows an example of a numbering pattern that can be used when m and n are both equal to four. FIG. 8 creates patterns in which the black pixels spiral outward from the center of the block. By following the sequence in FIG. 7 or FIG. 8, the bi-level pattern generator 12 can generate a pattern equivalent of a single halftone dot.

Figure 9:
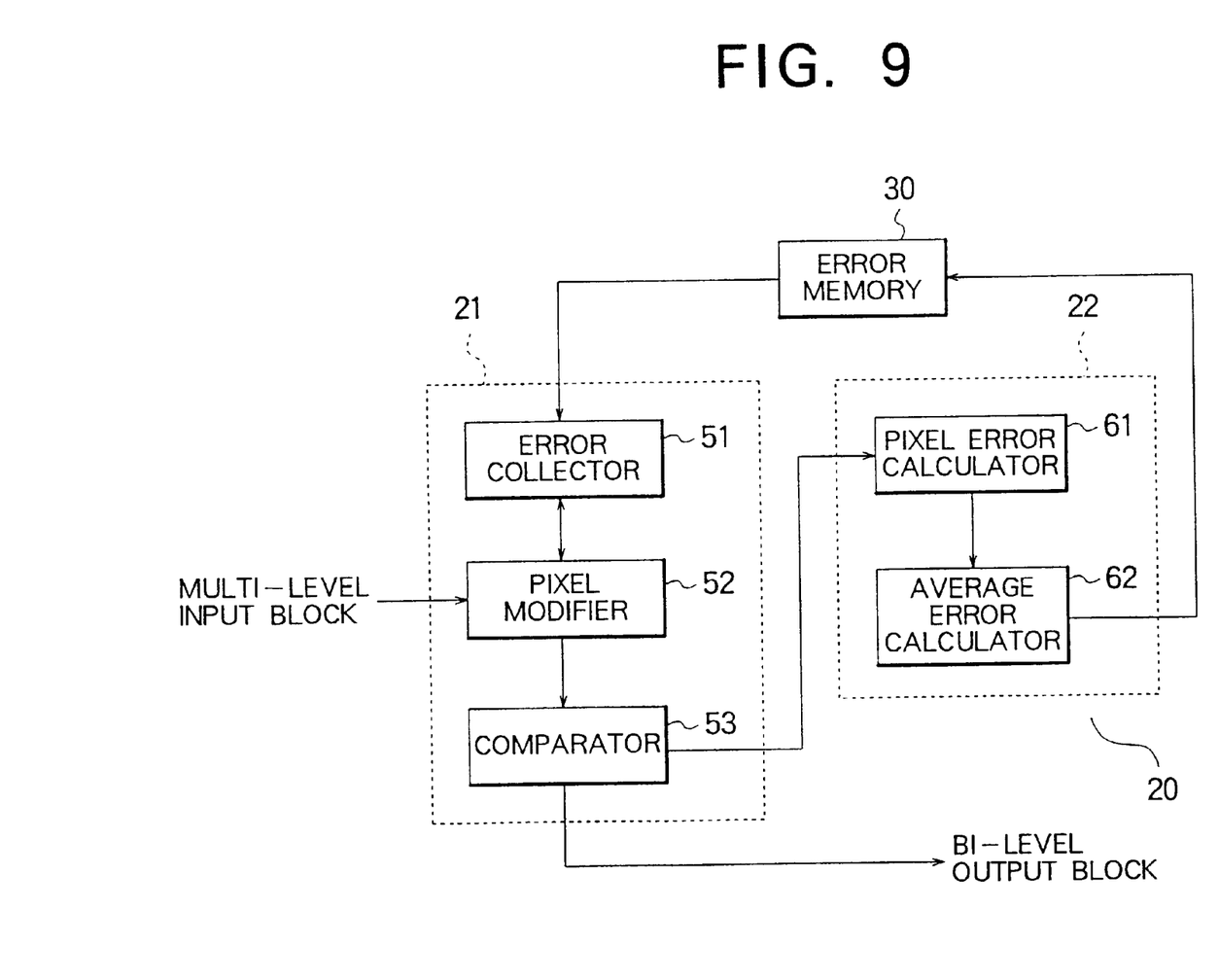
FIG. 9 is a more detailed block diagram of the bi-level error diffusion processor in the apparatus.

Next, the detailed structure of the bi-level quantizer 21 and error calculator 22 in the bi-level error diffusion processor 20 will be described.

Referring to FIG. 9, the bi-level quantizer 21 comprises an error collector 51, a pixel modifier 52, and a comparator 53. The error collector 51 is similar to the error collector 42, and calculates the block error sum BEsum by the same formula as given above.

The pixel modifier 52 adds BEsum to each pixel value d(i, j) in the block received from the selector 8 to generate modified pixel values s(i, j).

$$s(i, j) = d(i, j) + BEsum(i=0 \text{ to } m-1, j=0 \text{ to } n-1)$$

The comparator 53 compares the modified pixel values s(i, j) with corresponding threshold values t(i, j). If s(i, j) is greater than t(i, j), the comparator 53 outputs a black pixel at position (i, j) in the block. If s(i, j) is equal to or less than t(i, j), the comparator 53 outputs a white pixel at position (i, j).

The threshold values t(i, j) preferably increase in a pattern that spreads outward from the center of the block, increasing in the same order as shown FIG. 8, for example. This type of threshold pattern tends to concentrate black pixels toward the center of the block, thereby reducing spatial frequencies in the output image, but does not force the black pixels to cluster around the center of the block. For example, if a modified block has a sharp vertical edge dividing black or nearly black pixels on the left from white or nearly white pixels on the right, the output block will be black on the left and white on the right; the edge will not be blurred.

The numbers in FIG. 8 do not represent the threshold values t(i, j) themselves, but only indicate an order in which these threshold values can increase. Similarly, if two-by-two blocks are used, the thresholds t(i, j) can increase in the order shown in FIG. 7.

The modified pixel values s(i, j) vary between the limits Smax and Smin mentioned above. Smax corresponds to the output level a black pixel, and Smin to the output level of a white pixel.

The error calculator 22 in FIG. 9 comprises a pixel error calculator 61 and an average error calculator 62. The pixel error calculator 61 subtracts the output level Smax or Smin from the modified value s(i, j) of each pixel to compute a pixel error e(i, j). The average error calculator 62 computes the average of all of the pixel errors e(i, j) in the block to obtain the block error BE(x, y), and stores the block error in the error memory 30 for use in the processing of subsequent blocks.

The invention can be practiced in hardware by providing arithmetic, logic, and memory circuits with the functions described above.

The invention can also be practiced in software, as a printer driver program stored on a magnetic disk or other memory device in a personal computer or other type of computer. The invention can also be practiced as a program stored in a memory device in a printer, and executed by a processing unit embedded in the printer. When the invention is practiced in software, the elements shown in the drawing correspond to different modules, routines, or data storage areas, defined by computer-readable code.

Next, the operation of the image processing apparatus in FIG. 5 will be described with reference to the flowcharts in FIGS. 10, 11, and 12. The flowcharts indicate a possible coding of a computer program when the invention is practiced in software.

Figure 10:
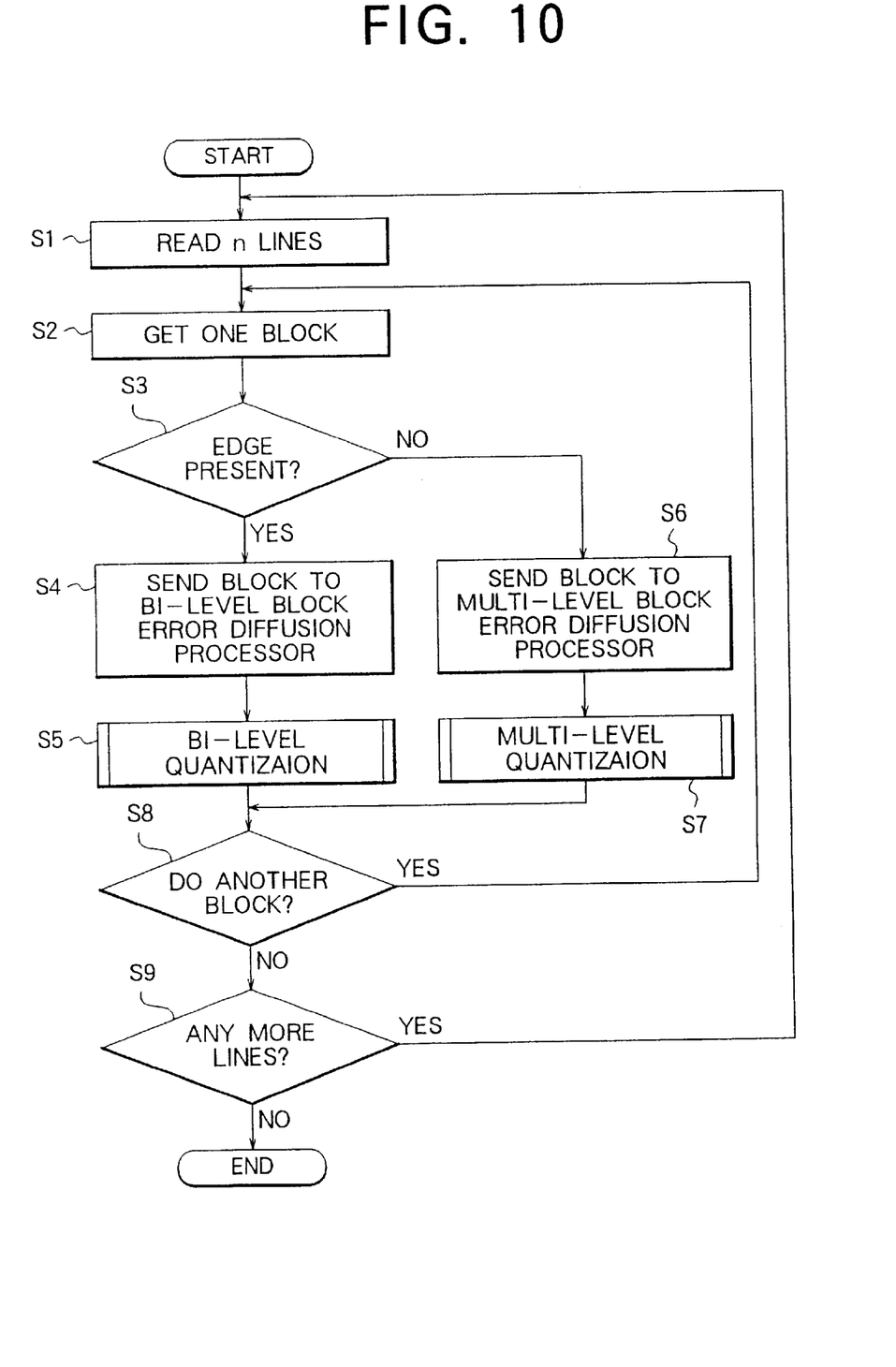
FIG. 10 is a flowchart illustrating the operation of the apparatus.

FIG. 10 illustrates the overall operation of the image processing apparatus.

In step S1, the image partitioner 7 reads n lines of pixels from the input image. In step S2, the image partitioner 7 takes one m-by-n block of pixels from these n lines, and sends the block to the selector 8. In step S3, the selector 8 detects the presence or absence of edges in the block. If an edge is present, the block is sent in step S4 to the bi-level error diffusion processor 20, which carries out the bi-level quantization process in step S5. If no edge is present, the block is sent in step S6 to the multi-level error diffusion processor 10, which carries out the multi-level quantization process in step S7.

In step S8, if there is another block to be processed in the n lines read in step S1, a return is made to step S2. The loop from step S2 to step S8 is repeated until all m-by-n blocks in the n lines have been processed.

In step S9, if there are further lines to be processed in the input image, a return is made to step S1. The loop from step S1 to step S9 is repeated until the entire image has been processed.

Figure 11:
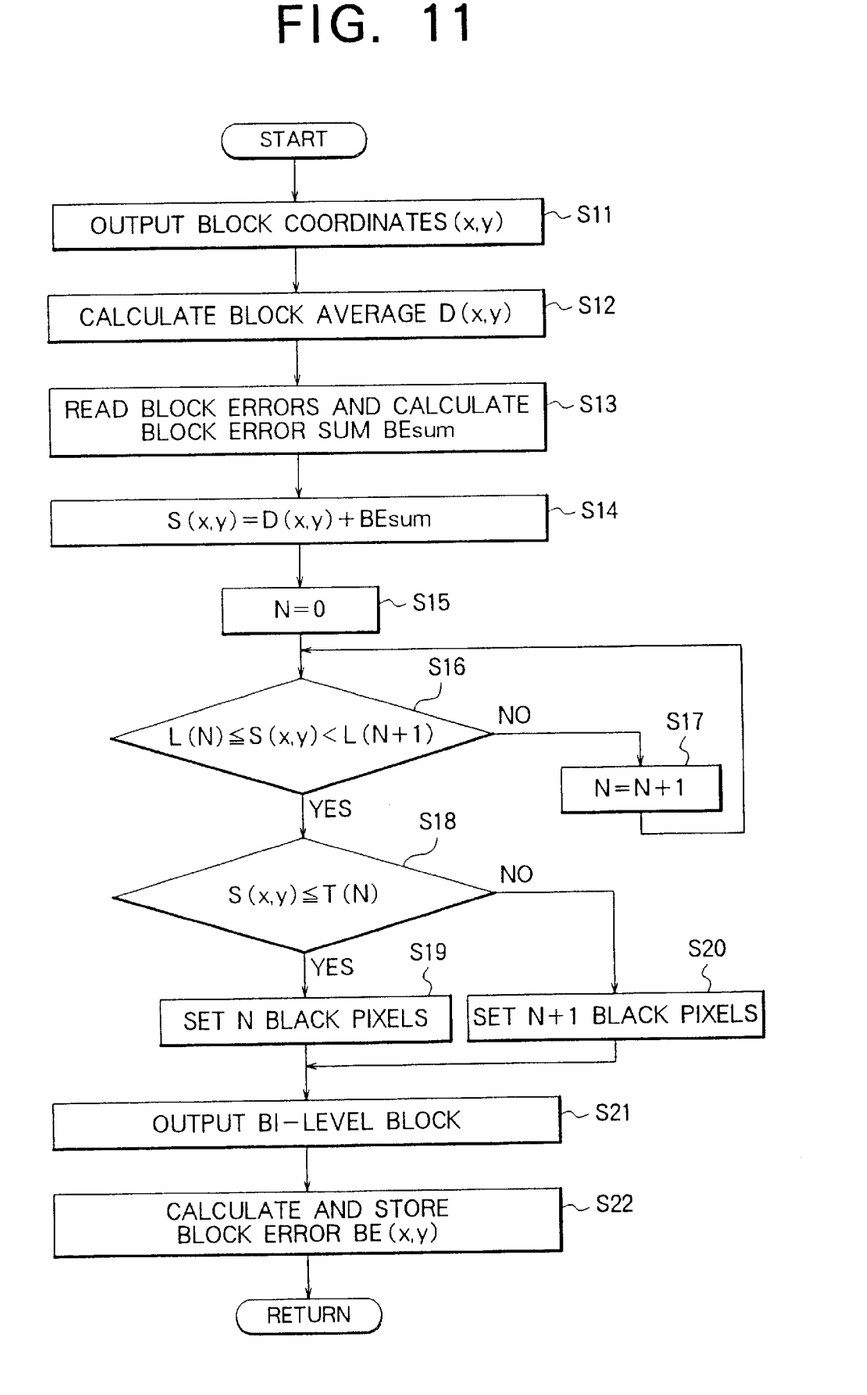
FIG. 11 is a flowchart illustrating the operation of the multi-level error diffusion processor.

FIG. 11 illustrates the multi-level quantization process.

When the block averager 41 receives the pixel values of the block, in step S11, the average modifier 43 outputs the block coordinates (x, y) to the error collector 42. At the same time, in step S12, the block averager 41 calculates the average value D(x, y) of the pixel values d(i, j) in the block, and sends D(x, y) to the average modifier 43. In step S13, the error collector 42 reads the block error values BE(x−1, y), BE(x, y−1), BE(x−1, y−1), and BE(x+1, y−1) of the neighboring blocks that have already been processed, and calculates the block error sum BEsum by the formula given earlier. In step S14, the average modifier 43 adds BEsum to D(x, y) to calculate the modified block average S(x, y), and sends S(x, y) to the comparator 45.

To find the output level of the block, the quantity N is set to zero in step S15, and the following condition is tested in step S16.

$$L(N) \leq S(x, y) < L(N+1)$$

If this condition is false, the value of N is incremented in step S17, and step S16 is repeated.

When the condition in step S16 is satisfied, S(x, y) is compared with the threshold value T(N) in step S18, to test the following condition.

$$S(x, y) \leq T(N)$$

If this condition is true, the comparator 45 sets the number of black pixels to be placed in the output bi-level block to N in step S19. If this condition is false, the number of black pixels is set to N+1 in step S20. In step S21, the bi-level pattern generator 12 arranges the black pixels in a predetermined pattern, preferably a pattern clustered around the center of the block, and outputs the resulting the bi-level block.

Finally, in step S22, the error calculator 13 calculates the block error BE(x, y) by subtracting the output level L(N) or L(N+1) from the modified average value S(x, y), and stores BE(x, y) in the error memory 30.

Figure 12:
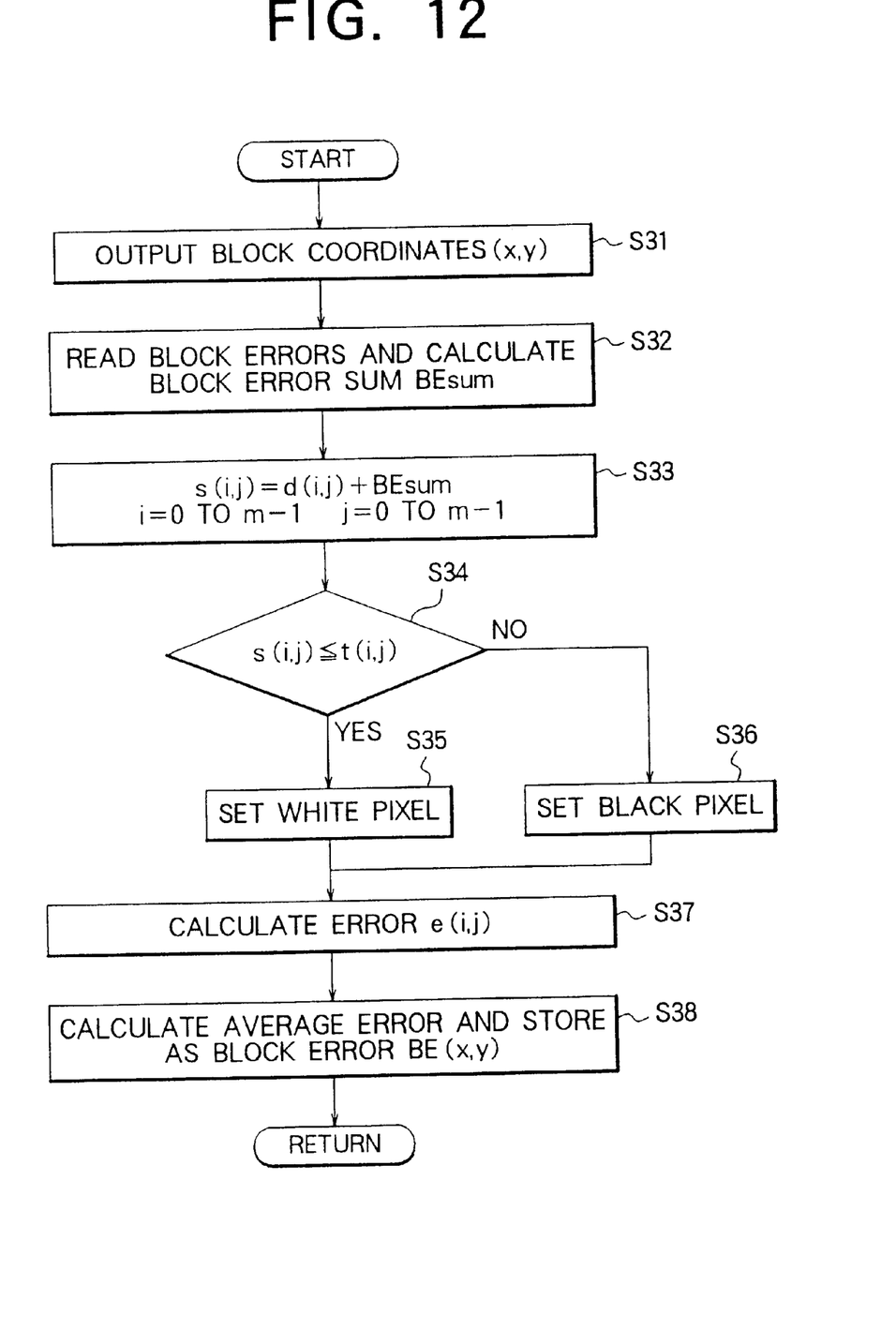
FIG. 12 is a flowchart illustrating the operation of the bi-level error diffusion processor.

FIG. 12 illustrates the bi-level quantization process.

When the pixel modifier 52 receives the pixel values of the block, in step S31, the pixel modifier 52 outputs the block coordinates (x, y) to the error collector 51. In step S32, the error collector 51 reads the block error values BE(x−1, y), BE(x, y−1), BE(x−1, y−1), and BE(x+1, y−1) of the neighboring block that have already been processed, and calculates the block error sum BEsum by the formula given earlier. In step S33, the pixel modifier 52 adds BEsum to each pixel value d(i, j) in the block to calculate a modified pixel value s(i, j), and sends the modified pixel values to the comparator 53.

In step S34, the comparator 53 compares each modified pixel value s(i, j) in the block with the corresponding threshold t(i, j), testing the following condition.

$$s(i, j) \leq t(i, j)$$

Pixels for which this condition is true are set to the white output level (Smin) in step S35. Pixels for which this condition is false are set to the black output level (Smax) in step S36.

As the output level of each pixel is determined, the pixel error calculator 61 calculates the corresponding pixel quantization error e(i, j) in step S37, by subtracting Smin or Smax from s(i, j). When error values for all the pixels in the block have been calculated, the average error calculator 62 calculates the average pixel quantization error in the block, and stores this average error in the error memory 30 as the block error BE(x, y) in step S38.

Compared with the conventional error diffusion method, the invented block error diffusion method reduces the number of accesses to the error memory 30 by a factor of m×n, and reduces the number of arithmetic operations required for calculating weighted sums of quantization errors by a similar factor. This leads to a considerable saving of processing time, even when the minimum two-by-two block size is employed. A related advantage is that the error memory 30 requires comparatively little memory space.

Use of average block error values instead of the error values for individual pixels leads to some loss of image quality, as compared with conventional error diffusion, but if the block size is small, the loss is not very noticeable. The block size can be selected on the basis of the desired output image quality and processing speed.

In input image areas having a generally smooth appearance, corresponding to blocks without edges, use of the multi-level quantization process enhances the quality of the output image by greatly reducing the block quantization error, thereby improving the smoothness with which the gray levels are expressed. This gain in image quality is partly offset by a loss of spatial resolution, because an entire block of input pixels is converted to a pattern equivalent to a single halftone dot, but little image detail is lost, because the multi-level quantization process is used only in areas that are free of abrupt changes in image content.

In areas in which the image content changes abruptly, corresponding to blocks with edges, the bi-level quantization process reduces the loss of spatial resolution. Sharp edges are reproduced sharply, for example.

In using a fixed pattern to represent a quantized gray level, the multi-level quantization process resembles the conventional halftone pattern process. In the use of a matrix of differing threshold values, the bi-level quantization process resembles conventional dithering. Because of the diffusion of quantization error from neighboring blocks, however, the multi-level and bi-level quantization processes can reproduce gray levels more smoothly than can the conventional halftone pattern and dithering processes. Block error diffusion creates an output image that is free of contour lines and other obvious defects.

Use of the terms black and white does not imply that the invention is limited to the processing of monochrome images. Color images can also be processed, using the invented method to convert each color plane separately.

When a color image is processed, patterns like the one shown in FIG. 8, that cause colored pixels to cluster around the center of a block output by the multi-level error diffusion processor 10, or tend to concentrate colored pixels toward the center of a block output by the bi-level error diffusion processor 11, have a further advantage. With color printers, there is usually some registration error between the different colors. Use of concentrated or clustered patterns makes the registration error less visible.

The image processing apparatus in FIG. 5 is not limited to operation in the manner described above. As one possible variation, bi-level quantization or multi-level quantization can be selected for the image as a whole, according to a command given at the start of processing. As another possible variation, the invention can be practiced using only bi-level quantization, or only multi-level quantization, for all images.

The threshold values used in bi-level quantization need not be fixed. Different threshold patterns can be used for different types of input images. Similarly, the output patterns used in multi-level quantization need not be fixed.

The method of edge detection is not limited to comparison of the values of corner pixels of a block. Other known methods of edge detection can be employed.

The invention is not limited to the distribution scheme illustrated in FIGS. 3 and 4. The quantization error of each block can be distributed to any number of neighboring blocks, in any neighboring positions, which need not necessarily be directly adjacent.

The procedures given in the flowcharts can be modified in various ways. For example, the comparator 45 can select a block output value L(N) by comparing the modified block average S(x, y) directly with the thresholds to find a value of N satisfying the following condition, and can employ a binary search technique instead of testing the values of N in a consecutive sequence.

$$T(N-1) < S(x, y) \leq T(N)$$

The multi-level quantization process can be carried out by first adding the block error sum BEsum to each pixel value d(i, j), then finding the average value S(x, y) of the resulting modified pixel values s(i, j). This order of operations is less efficient, but the end result is the same.

Those skilled in the art will recognize that further variations are possible within the scope claimed below.

What is claimed is:

1. A method of converting a multi-level image to a bi-level image, comprising the steps:

dividing said multi-level image into blocks, each block comprising a plurality of pixels;

detecting edges in said blocks;

selecting a bi-level quantization process for each said block in which said edges are present, and a multi-level quantization process for each said block in which said edges are absent;

for each said block for which the multi-level quantization process is selected:
(i) calculating an average pixel value;
(ii) modifying said average pixel value for said block according to block quantization errors in neighboring blocks quantized previously;
(iii) quantizing the modified average pixel value by comparing said modified average pixel value with a plurality of threshold values, thereby generating a quantized value; and
(iv) outputting a pattern of bi-level pixels corresponding to said quantized value;

for each said block for which the bi-level quantization process is selected:
(i) modifying each pixel value in said block according to said block quantization errors in neighboring blocks quantized previously; and
(ii) converting each modified pixel value in each said block to a bi-level pixel value by comparing each said modified pixel value with a respective threshold value in a pattern of threshold values;

and calculating and storing a single block quantization error for each said block, for use in modifying neighboring blocks processed afterward.

2. The method of claim 1, wherein said pattern comprises a predetermined number of black pixels clustered around a center of said block.

3. The method of claim 1, wherein said bi-level quantization process employs different threshold values for different pixels in said block.

4. A computer-readable medium storing computer code means for converting a multi-level image to a bi-level image by the method of claim 1.

5. The method of claim 1, wherein said quantized value specifies a number of bi-level pixels having a particular value in the pattern corresponding to said quantized value.

6. An image processing apparatus for converting a multi-level image to a bi-level image, comprising:

an image partitioner for dividing said multi-level image into blocks, each block comprising a plurality of pixels;

a selector coupled to said image partitioner, for detecting edges in said blocks, the selector selecting a bi-level quantization process for each said block in which said edges are present, and selecting a multi-level quantization process for each said block in which said edges are absent; and a block error diffusion processor, coupled to said image partitioner, for modifying pixel values in each said block according to block quantization errors in neighboring blocks quantized previously, quantizing each said block, as thus modified, thereby generating a bi-level output block, and calculating and storing a single block quantization error for each said block, for use in modifying neighboring blocks processed afterward;

wherein said block error diffusion processor has a multi-level error diffusion processor for quantizing each block for which said multi-level quantization process is selected to a quantized value having more than two possible levels, then generating a pattern of bi-level output pixels from said quantized value, and a bi-level error diffusion processor for quantizing each block for which said bi-level quantization process is selected, by comparing each pixel value in said block with a threshold value.

7. The image processing apparatus of claim 6, wherein said pattern comprises a predetermined number of black pixels clustered around a center of said block.

8. The image processing apparatus of claim 6, wherein said multi-level error diffusion processor calculates an average value of the pixels in said block for which said multi-level quantization process is selected, modifies said average value according to said block quantization errors in neighboring blocks processed preciously, then compares the modified average value with a plurality of threshold values.

9. The image processing apparatus of claim 6, wherein said bi-level error diffusion processor uses different threshold values for different pixels in said block for which said bi-level quantization process is selected.

10. The image processing apparatus of claim 6, wherein said quantized value specifies a number of bi-level pixels having a particular value in the pattern generated from said quantized value.

* * * * *